United States Patent [19]
Neal

[11] 3,864,863
[45] Feb. 11, 1975

[54] FISH LURE
[76] Inventor: Donald C. Neal, 1303 Pa. Ave. East, Warren, Pa. 16365
[22] Filed: June 30, 1972
[21] Appl. No.: 268,031

[52] U.S. Cl............................. 43/42.15, 43/42.25
[51] Int. Cl............................................ A01k 93/00
[58] Field of Search....................... 43/42.25, 42.15

[56] References Cited
UNITED STATES PATENTS
| | | | |
|---|---|---|---|
| 1,990,693 | 2/1935 | Hildebrant | 43/42.15 |
| 2,199,001 | 4/1940 | Khoenle | 43/42.15 |
| 3,017,307 | 1/1962 | Halliburton | 43/42.25 |

Primary Examiner—Robert Peshock
Assistant Examiner—J. Q. Lever

[57] ABSTRACT

The present invention relates to an artificial fish lure and particularly to a lure with a weighted head and a non-swiveling blade. The hook passes through a hole in the blade and can move freely through a limited range but it cannot rotate, resulting in a back and forth motion. The weighted head prevents the blade from rotating the entire lure. The size of the blade is related to the weight of the head so as to cause the entire lure to wiggle.

1 Claim, 2 Drawing Figures

FISH LURE

OBJECTS OF THE INVENTION

It is an object of the invention to provide an improved artificial fish lure.

Another object of the invention is to provide an artificial fish lure which is simple in construction, economical to manufacture, and easy to use.

It is another object of the invention to provide an artificial fish lure with an action in the water that is attractive to fish.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
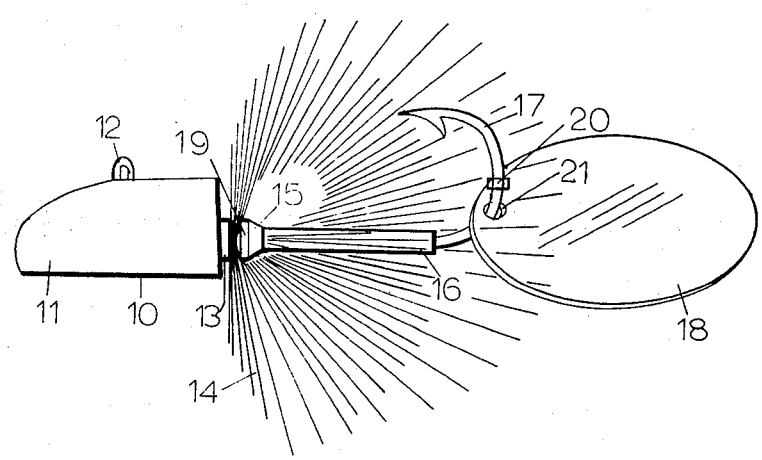
FIG. 1 is a side view of the fish lure according to the invention.
Figure 2:
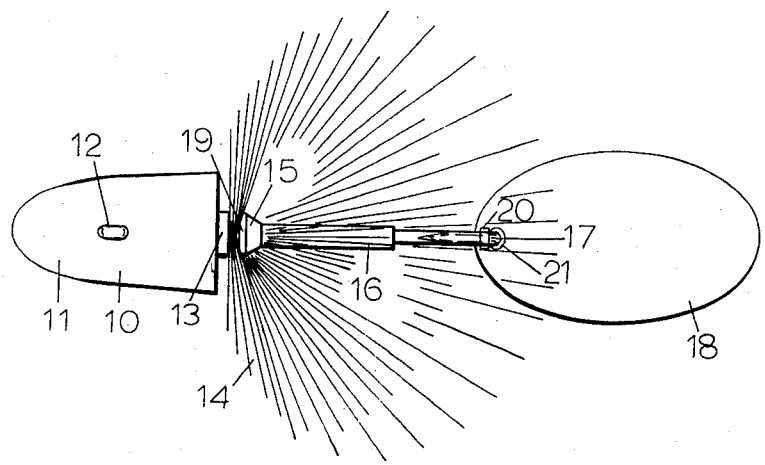
FIG. 2 is a top view of the fish lure according to the invention.

Now with more particular reference to the drawings, the artificial fish lure indicated generally at 10 has a weighted head 11 of suitable size. The weighted head has eyelet member 12 integrally attached to it which is of a size suitable for attaching the lure to a line or leader. The conventional fish hook 17 is fixed to the head and the hook extends rearwardly with reference to the lure and then extends upwardly and forwardly terminating in a pointed and barbed end. The attraction means 14 made up of feathers or other materials is of appropriate size and color and is bound to the hook 17 with a number of turns of thread 13 on the forward side of the attraction means 14. A metal grommet 19 and more turns of thread 15 are fixed on the rearward side of the attraction means. A plastic tube 16 fits over the shaft of the hook 17 along the rearward length of the hook. The hook 17 extends through the hole 21 in the single blade 18. The plastic grommet 20 prevents the blade 18 from slipping back over the end of hook 17. The blade 18 and hook 17 are free to move relative to each other within the limits of the space between the blade 18 and hook 17. This restricted movement imparts to the blade 18 a function other than to attract. When the blade is mounted on the hook, it cannot rotate or swivel but will move back and forth in a flip-flop type of movement. The weighted head 11 is required to give the lure mass and to prevent the blade from rotating the entire lure. The weight should be more than twice the weight of the blade. The blade 18 is oval shaped and has a cross sectional area substantially larger than the cross sectional area of the head. The inter-related functioning of the size of the blade 18 related to the weight of head 11 causes the entire lure to wiggle.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An artificial fish lure comprising
   a weighted head,
   a single blade,
   a barbed hook,
   said head having an eyelet fixed thereon on the side of said head adjacent said hook,
   an attracting means,
   said hook having a tube disposed around it adjacent said head,
   a grommet around said hook spaced from said tube,
   said blade having a hole therein, said hook passing through said hole and said blade being disposed between said tube and said grommet,
   said weighted head and said hook being fixed together,
   said blade being generally oval in shape and having an area substantially larger than the cross sectional area of said said,
   said head having a weight at least twice the weight of said blade,
   said blade imparts a wriggling action to the lure without causing the entire lure to rotate, to attract fish.

* * * * *